United States Patent
Kim et al.

(10) Patent No.: US 11,641,033 B2
(45) Date of Patent: May 2, 2023

(54) ELECTRONIC DEVICE HAVING SOLID-STATE BATTERY

(71) Applicant: SAMSUNG ELECTRO-MECHANICS CO., LTD., Suwon-si (KR)

(72) Inventors: Young Mi Kim, Suwon-si (KR); Chang Sung Park, Suwon-si (KR); Tai Young Kim, Suwon-si (KR); Kwang Wook Bae, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 170 days.

(21) Appl. No.: 17/003,484

(22) Filed: Aug. 26, 2020

(65) Prior Publication Data

US 2021/0111440 A1  Apr. 15, 2021

(30) Foreign Application Priority Data

Oct. 11, 2019  (KR) .......................... 10-2019-0125952

(51) Int. Cl.
*H01M 10/44* (2006.01)
*H01M 10/42* (2006.01)
*H02J 7/00* (2006.01)

(52) U.S. Cl.
CPC ..... *H01M 10/441* (2013.01); *H01M 10/4207* (2013.01); *H02J 7/0013* (2013.01); *H02J 7/00032* (2020.01); *H01M 2220/30* (2013.01)

(58) Field of Classification Search
CPC .................................................. H01M 10/441
USPC .......................................................... 320/128
See application file for complete search history.

(56) References Cited

U.S. PATENT DOCUMENTS

| | | | |
|---|---|---|---|
| 2007/0202414 A1 | 8/2007 | Yoshida et al. | |
| 2009/0208816 A1* | 8/2009 | Viavattine | H01M 4/70 429/161 |
| 2012/0105001 A1* | 5/2012 | Gallegos | H01M 10/441 320/109 |
| 2013/0260257 A1* | 10/2013 | Choi | H01M 10/056 429/303 |
| 2017/0025705 A1 | 1/2017 | Miara et al. | |
| 2019/0006722 A1* | 1/2019 | Kim | H01M 10/425 |
| 2019/0198939 A1* | 6/2019 | Zhang | H02J 7/007184 |

FOREIGN PATENT DOCUMENTS

| | | |
|---|---|---|
| JP | 2001-527273 A | 12/2001 |
| JP | 2007-258165 A | 10/2007 |
| JP | 2008-4379 A | 1/2008 |
| KR | 10-2013-0111833 A | 10/2013 |
| KR | 10-2017-0012042 A | 2/2017 |
| WO | 99/33124 A1 | 7/1999 |

\* cited by examiner

*Primary Examiner* — Yalkew Fantu
(74) *Attorney, Agent, or Firm* — Morgan, Lewis & Bockius LLP

(57) ABSTRACT

An electronic device includes a storage in which at least one or more programs are stored, a power management circuit, a controller controlling the storage and the power management circuit, a first battery cell connected to the power management circuit, and a second battery cell connected to the storage. At least one of the first battery cell or the second battery cell includes a solid electrolyte.

15 Claims, 10 Drawing Sheets

- RELATED ART -

ELECTRONIC DEVICE HAVING SOLID-STATE BATTERY

CROSS-REFERENCE TO RELATED APPLICATION(S)

The present application claims the benefit of priority to Korean Patent Application No. 10-2019-0125952, filed on Oct. 11, 2019 in the Korean Intellectual Property Office, the entire disclosure of which is incorporated herein by reference for all purposes.

TECHNICAL FIELD

The present disclosure relates to an electronic device.

BACKGROUND

In general, a portable electronic device has a built-in battery that may be charged. The storage capacity of the built-in battery may be an important requirement for determining the use time of the electronic device. Therefore, one way to increase the use time of the electronic device is to increase the storage capacity of the built-in battery. However, increasing the storage capacity of the built-in battery may be limited. For this reason, various methods for efficiently managing power consumption in electronic devices have been proposed.

In the related art, a method of accurately predicting and managing power consumption in an electronic device is mainly used. To perform an application (hereinafter, referred to as a 'software element' or 'SW element') corresponding to software installed in the electronic device, power consumption may be obtained through the sum of power consumption amount involved in operating a configuration (hereinafter, referred to as a 'hardware element' or 'HW element') corresponding to hardware constituting the electronic device.

For predicting and managing power consumption, a power management circuit uses a separate program, and performs a function of adjusting the amount of power supplied to each hardware element, according to the battery consumption and the remaining amount of power. FIG. 1 is a schematic diagram schematically illustrating a configuration of an electronic device 10 to which the power management circuit is applied. Referring to FIG. 1, a power management circuit performs a function of supplying electricity required for driving the hardware according to the remaining power amount of a battery 14.

Recently, the capacity of a battery required has increased due to a tendency to apply a larger display and an increase in power required by the processor. However, the lithium ion all-solid-state battery used in the related art should be comprised of one battery cell for reasons such as stability or the like. In this case, the battery in the electronic device has the largest size as a single component, and is a major cause of deteriorating the degree of freedom of internal design.

SUMMARY

An aspect of the present disclosure is to provide an electronic device having an improved degree of freedom in structural design.

Another aspect of the present disclosure is to provide an electronic device having relatively high stability.

Another aspect of the present disclosure is to provide an electronic device having excellent electrical efficiency.

Another aspect of the present disclosure is to provide an electronic device in which deterioration of a battery cell may be prevented.

According to an aspect of the present disclosure, an electronic device includes a storage in which at least one or more programs are stored, a power management circuit, a controller controlling the storage and the power management circuit, a first battery connected to the power management circuit, and a second battery connected to the storage. At least one of the first battery or the second battery includes a solid electrode.

According to another aspect of the present, an electronic device includes a storage in which at least one or more programs are stored, a power management circuit, a controller controlling the storage and the power management circuit, and a plurality of battery cells each including an all-solid-state battery, wherein a first battery cell among the plurality of battery cells is connected to the power management circuit, and a second battery cell among the plurality of battery cells is connected to the storage.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
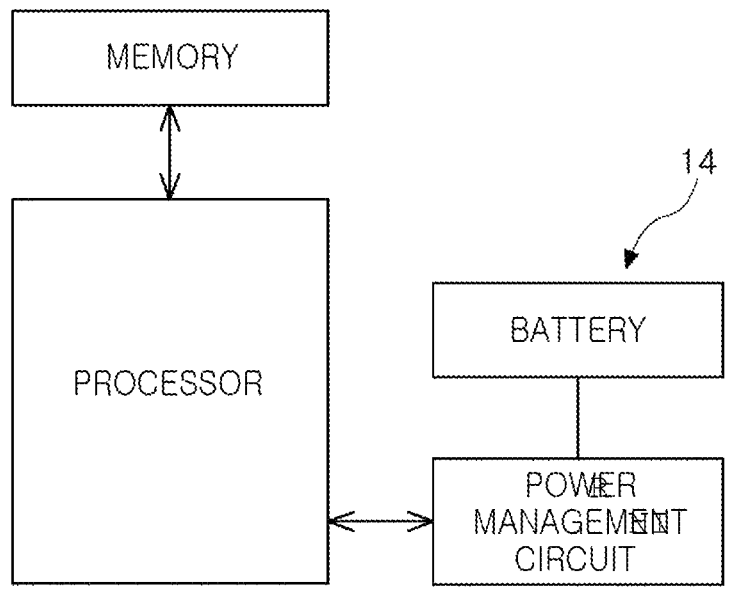
FIG. 1 is a schematic diagram illustrating the structure of a related art electronic device.
Figure 2:
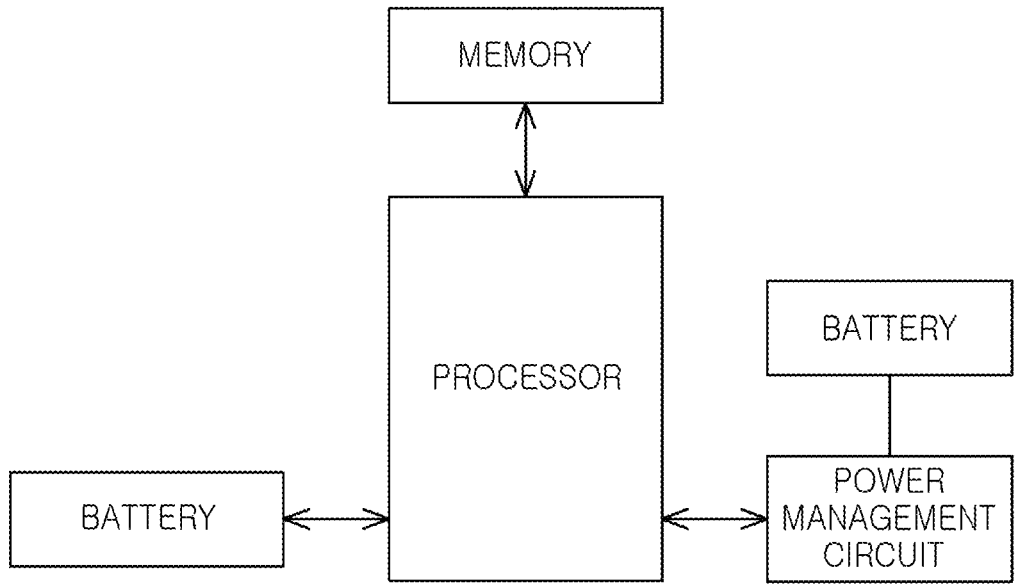
FIG. 2 is a schematic diagram illustrating the structure of an electronic device according to an embodiment of the present disclosure.

Hereinafter, embodiments of the present disclosure will be described with reference to specific embodiments and the accompanying drawings. It is not intended to limit the techniques described herein to specific embodiments, but it should be understood that it includes various modifications, equivalents, and/or alternatives of embodiments of the invention. In connection with the description of the drawings, similar reference numerals may be used for similar elements.

In this specification, expressions such as "have", "can have", "includes", or "can contain" refer to the presence of a corresponding feature (e.g., a component such as a numerical value, function, operation, or part) and does not exclude the presence of additional features.

In this specification, expressions such as "at least one of A or B", "at least one of A or/and B", or "one or more of A or/and B" may include all possible combinations of items listed together. For example, "A or B", "at least one of A and B", or "at least one of A or B" includes (1) at least one A, (2) at least one B, or (3) all cases including both at least one A and at least one B.

Expressions such as 1st, 2nd, first, or "second," as used in this specification may modify various components, regardless of order and/or importance, and are used to distinguish components from other components, but do not limit the components. For example, the first battery and the second battery may represent different user devices regardless of order or importance. For example, the first component may be referred to as a second component without departing from the scope of rights described herein, and similarly, the second component may also be referred to as a first component.

In this specification, when it is said that a component (e.g., a first component) is "connected (operatively or communicatively coupled with/to) to" another component (e.g., a second component)", it should be understood that any of the above components may be directly connected to the other component, or may be connected through another component (e.g., a third component). On the other hand, when it is mentioned that one component (e.g., the first component) is "directly connected" or "directly coupled" to another component (e.g., the second component), it may be understood that another component (e.g., the third component) does not present between the above component and the other component.

As used herein, the expression "configured to (or configured)" may be used interchangeably with, depending on the situation, for example, "suitable for", "having the capacity to", "designed to", "adapted to", "made to", or "capable of". The term "configured to (or set)" may not necessarily mean only "specifically designed to" in hardware. Instead, in some situations, the expression "device configured to" may mean that the device "can" with other devices or parts. For example, the phrase "processor configured (or set) to perform A, B, and C" may mean a general-purpose processor (e.g., CPU or application processor) capable of performing the corresponding operations by executing a dedicated processor (e.g., an embedded processor) to perform the operation, or one or more software programs stored in the memory device.

The terms used in this specification are only used to describe specific embodiments, and may not be intended to limit the scope of other embodiments. Singular expressions may include plural expressions unless the context clearly indicates otherwise. Terms used herein, including technical or scientific terms, may have the same meaning as commonly understood by a person skilled in the art described in this document. Among the terms used in this specification, terms defined in a general dictionary may be interpreted as meanings identical or similar to meanings in the context of related technologies, and are ideally or excessively formal meanings unless explicitly defined herein. In some cases, even terms defined in this specification cannot be interpreted to exclude embodiments of the present document.

An electronic device according to various embodiments of the present disclosure may include at least one of, for example, a smart phone, a tablet personal computer (PC), a mobile phone, a video phone, an e-book reader, a desktop personal computer (PC), a laptop PC, a netbook computer, workstation, server, a personal digital assistant (PDA), a portable multimedia player (PMP), an MP3 player, a mobile medical device, a camera, or a wearable device. According to various embodiments, the wearable device may include at least one of an accessory type (e.g., a watch, ring, bracelet, anklet, necklace, glasses, contact lens, or a head-mounted device (HMD), a fabric or garment integrated type (for example, an electronic garment), a body attachment type (for example, a skin pad or a tattoo), or a biotransplantation type (for example, an implantable circuit).

In some embodiments, the electronic device may be a home appliance. Home appliances may include at least one of, for example, televisions, digital video disk (DVD) players, audio, refrigerators, air conditioners, vacuum cleaners, ovens, microwave ovens, washing machines, air cleaners, set-top boxes, and home automation control panels, security control panels, TV boxes (e.g., Samsung HomeSync™, Apple TV™ or Google TV™), game consoles (e.g., Xbox™, PlayStation™), electronic dictionaries, electronic keys, camcorders, or electronic picture frames.

In another embodiment, the electronic device may include at least one of various medical devices (e.g., various portable medical measurement devices (such as a blood glucose meter, a heart rate monitor, a blood pressure meter, or a body temperature meter), magnetic resonance angiography (MRA), magnetic resonance imaging (MRI), computed tomography (CT), a camera, or an ultrasonic device, etc.), a navigation device, a global positioning system (GPS) receiver, an event data recorder (EDR), a flight data recorder (FDR), an automotive infotainment device, marine electronic equipment (e.g., navigation systems for ships, gyro compasses, etc.), avionics, a security device, a head unit for vehicles, a robot for industrial or household use, an automatic teller's machine (ATM) in financial institutions, point of sales (POS) in stores, or internet of things (e.g., light bulbs, various sensors, electricity or gas meters, sprinkler devices, fire alarms, thermostats, street lights, toasters, exercise equipment, hot water tanks, heaters, boilers, etc.).

According to some embodiments, the electronic device may include at least one of furniture or a part of a building/structure, an electronic board, an electronic signature receiving device, a projector, or various measuring devices (e.g., water, electricity, gas, or radio wave measurement devices, etc.). In various embodiments, the electronic device may be one of the various devices described above, or combinations thereof. The electronic device according to an embodiment may be a flexible electronic device. In addition, the electronic device according to embodiments is not limited to the above-described devices, and may include a new electronic device according to technological development.

In the drawing, the X direction may be defined as a first direction, an L direction or a length direction, the Y direction as a second direction, a W direction or a width direction, and the Z direction as a third direction, a T direction, or a thickness direction.

Hereinafter, an electronic device according to an embodiment will be described in detail with reference to the accompanying drawings. An electronic device according to an embodiment may include a storage in which at least one program is stored; a power management circuit; a controller controlling the storage and the power management circuit; a first battery cell connected to the power management circuit; and a second battery cell connected to the storage. In this case, at least one of the first battery cell or the second battery cell may include an all-solid-state battery.

The storage, which may be a non-transitory memory, serves to store programs and data required for the operation of the electronic device, and may be divided into a program area and a data area. The program area may store programs for controlling the overall operation of the electronic device, an operating system (OS) for booting the electronic device, applications necessary for multimedia content playback, other optional functions of the electronic device, such as a voice chat function, a camera function, a sound playback function, applications image or video playback functions, and the like. The data area is an area in which data generated according to the use of the electronic device is stored, and images, videos, phone books, and audio data are stored.

The controller controls the overall operation of the electronic device. In detail, the controller may control all or part of a storage, a power management circuit, and a communication unit, an audio output unit, and/or a display to be described later. In detail, a predetermined operation may be performed according to a user's input (e.g., a touch input, a voice input, a gesture input, an input by a pupil input recognition unit, a brain wave input, an input by another user terminal device, etc.) to the electronic device. In addition, the controller may perform a predetermined operation determined depending on a previously input program.

The controller may include a processor. The processor may include one or more of a CPU, an application processor (AP), or a communication processor (CP). The processor may, for example, execute arithmetic operations or data processing related to control and/or communication of at least one or more other components of the electronic device.

The power management circuit (PMU) manages the power required for the operation of the electronic device to charge/discharge the battery, and when receiving power, the power management circuit (PMU) may transform the power to be suitable for being supplied to the battery. In this case, the power management circuit may be implemented as a power management integrated circuit (PMIC), and may include a processor that controls operations for power management or a resistor for current regulation, but in the present disclosure, hereinafter, for convenience of description, the detailed components of the power management circuit are not classified, and are collectively referred to as a 'power management circuit'.

In the above embodiment, at least one of a first battery cell or a second battery cell may include an all-solid-state battery. In this specification, the battery cell may mean a cell including at least one secondary battery, and one battery may have a cell or have a structure in which a plurality of secondary batteries are packed with an insulating material or the like as necessary. In this specification, the all-solid-state battery may mean a secondary battery to which a solid electrolyte is applied. The solid electrolyte may mean that the electrolyte is in a solid phase at room temperature (25° C.) and/or the driving temperature of the battery, and may mean an electrolyte having a higher glass transition temperature (Tg) than the temperature. The solid electrolyte may include a polymer-based solid electrolyte and/or a ceramic-based solid electrolyte. Since the battery to which the solid electrolyte is applied has a high output compared to the size, the all-solid-state battery may have excellent output efficiency even in a small size, thereby reducing the volume of the battery cell to which it is applied. Since battery cells of various sizes may be formed using this, the battery cells divided into a plurality of cells may be applied to an electronic device, thereby greatly improving the degree of freedom in structural design. The description of the solid electrolyte and the all-solid-state battery including the same will be described later.

In an embodiment, the electronic device may include a communication unit and a third battery cell connected to the communication unit. The communication unit performs a function of connecting the electronic device to an external device. Accordingly, the electronic device may receive various information required for driving the electronic device, update information for updating the electronic device, and the like through the communication unit. The communication unit may communicate with an external device depending on various communication methods. To this end, the communication unit may include various communication modules such as a short-range wireless communication module, a wireless communication module, and the like.

In this case, the short-range wireless communication module is a communication module that performs wireless communication with an external device located at a short distance, and may be, for example, Bluetooth or Zigbee. The wireless communication module is a module that performs communication by being connected to an external network according to wireless communication protocols such as Wi-Fi and IEEE. In addition, the wireless communication module may further include a mobile communication module that is connected to a mobile communication network according to various mobile communication standards such as the 3rd Generation (3G), the 3rd Generation Partnership Project (3GPP), the Long Term Evoloution (LTE) or the 5th Generation (5G) and that performs communications.

In an embodiment, the electronic device may include an audio output unit and a fourth battery cell connected to the audio output unit. The audio output unit may output audio under control of the controller. The audio output unit may output audio (e.g., voice, sound) input through the communication unit, or may output audio stored in the storage under control of the controller. The audio output unit may include at least one of a speaker, a headphone output terminal, or a Sony/Philips Digital Interface (S/PDIF) output terminal.

According to an embodiment, the electronic device may include a display and a fifth battery cell connected to the display. The display may refer to a device that displays various contents such as images, videos, texts, music, an application execution screen including various contents, a Graphic User Interface (GUI) screen, and the like. The display may be implemented in various forms, such as a liquid crystal display (LCD), a light-emitting diode (LED) display, an organic light-emitting diode (OLED) display, or liquid crystal on silicon (LCoS), Digital Light Processing (DLP), a quantum dot (QD) display panel, a micro electro-mechanical system (MEMS) display, an electronic paper display, etc., but is not limited thereto.

The display may be implemented in the form of a touch screen that forms a mutual layer structure with a touch pad. In this case, the display may be used as a user interface in addition to an output device. In this case, the touch screen may be configured to detect not only the touch input position and area, but also the touch input pressure.

Figure 3:
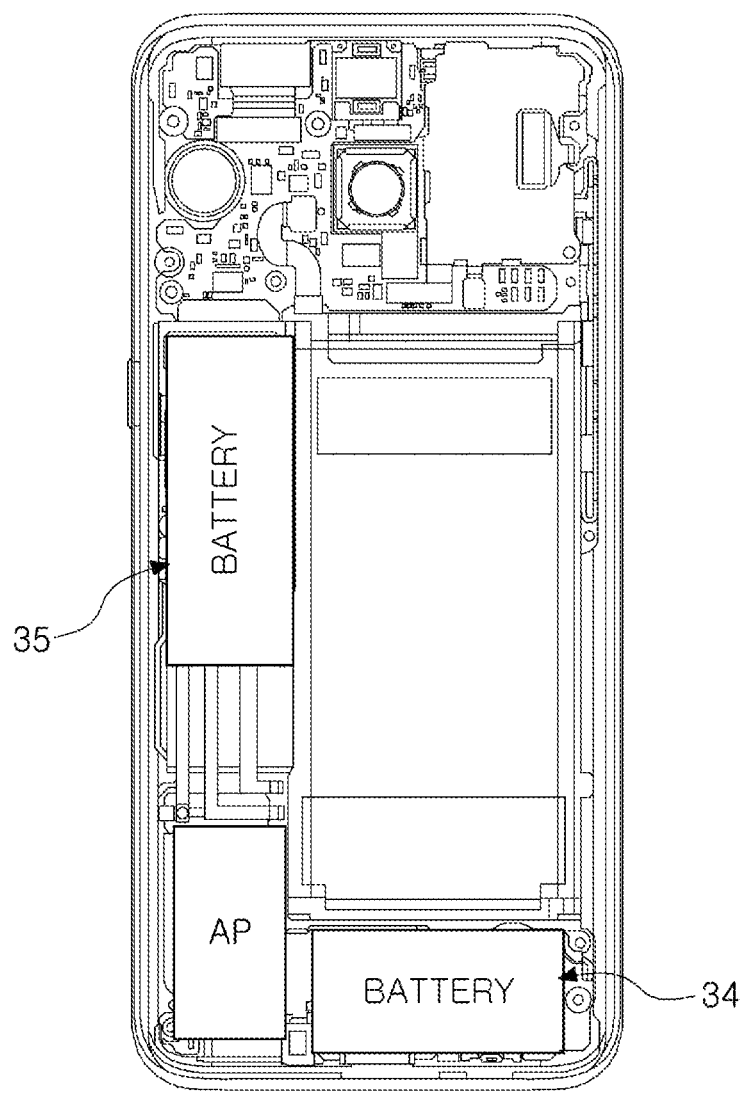
FIG. 3 is a cross-sectional view schematically illustrating an internal structure of an electronic device according to an embodiment of the present disclosure.

In an example, at least one or more of the first to fifth battery cells of the present disclosure may be disposed spaced apart from the other battery cells. The case in which the battery cells are spaced apart from the other battery cells, may mean that the battery cells are disposed at different locations inside the electronic device, and may mean that they are disposed at a predetermined distance, for example, at a distance of 10 μm or more and 10 cm or less. FIG. 3 is a perspective view illustrating an electronic device 30 according to an embodiment of the present disclosure. Referring to FIG. 3, a battery cell 34 and a battery cell 35 may be disposed at different locations. As described above, at least one or more of the first battery cell to the fifth battery cells may be disposed to be spaced apart from the other battery cells, such that various structures may be implemented to improve freedom of design.

In an embodiment, at least one battery cell among the first to fifth battery cells described above may have a different charging capacity from the other battery cells. In this specification, the charging capacity may mean an electric capacity or an electric charge amount that the battery cell may have, and may mean a nominal capacity at 25° C. and 1 atmosphere. When one or more battery cells of the first to fifth battery cells have different charging capacities from the other battery cells, power management may be performed separately by disposing the battery cells having a large charging capacity to be connected to components having relatively high power consumption.

In addition, this embodiment may be modified variously. For example, when the first battery cell to the fifth battery cell are arranged in order of the largest charging capacity, the first battery cell to the fifth battery cell may be connected according to the order in which the power consumption among the internal parts of the electronic device is high. In addition, the battery cells may be connected in various forms according to needs, such as connecting the first battery cell to the fifth battery cell in order of high charging capacity in order of high importance for driving the electronic device among respective components of the electronic device. FIG. 3 is a perspective view illustrating an exemplary electronic device of the present disclosure. Referring to FIG. 3, the battery cell 34 for exclusive use of an application processor (AP) with relatively high power consumption may be disposed separately from a battery cell 35 connected to a main board, and a battery cell having a relatively larger charging capacity may be connected directly to components having relatively high power consumption.

A method of differently forming the charging capacity of any one of the first to fifth battery cells is not particularly limited, and for example, may be performed by differently forming the number of all-solid-state batteries included in the battery cell or by changing the connection form of all-solid-state batteries. The charging capacity of the first to fifth battery cells is not particularly limited, and may be freely adjusted according to the characteristics of the component to be connected. The charging capacity may be, for example, 10 mAh or more, and 10000 mAh or less.

In an embodiment, at least one or more battery cells of the first to fifth battery cells described above may have a different operating voltage from the other battery cells. In this specification, the operating voltage may mean an average operating voltage when discharged at normal temperature and normal pressure, and may mean a nominal voltage at 25° C. and 1 atmosphere. When at least one of the first, second, third, fourth, or fifth battery cell has a different operating voltage from the other battery cells, the battery cells may be disposed depending on a required voltage of a component applied to an electronic device, and electricity consumed in a power circuit or the like may be reduced, thereby increasing the efficiency of use.

In the case of the above embodiment, various modifications may be applied. For example, the first to third battery cells may be designed to have an operating voltage optimized for the use environment of a specific component such as a display, and the fourth and fifth battery cells may be designed to have an operating voltage that may be universally applied to various components. Referring to FIG. 3, when it is necessary to increase the operating voltage to increase the driving speed of an electronic device 30, the battery cell 34 directly connected to the application processor AP may have a relatively high operating voltage, and as the battery cell 35 connected to the main substrate, a battery cell having a general operating voltage may be applied. In this case, the degree of freedom in structural design of the electronic device is increased, and a process such as voltage change may be significantly reduced to significantly increase the efficiency of electricity use.

Figure 4:
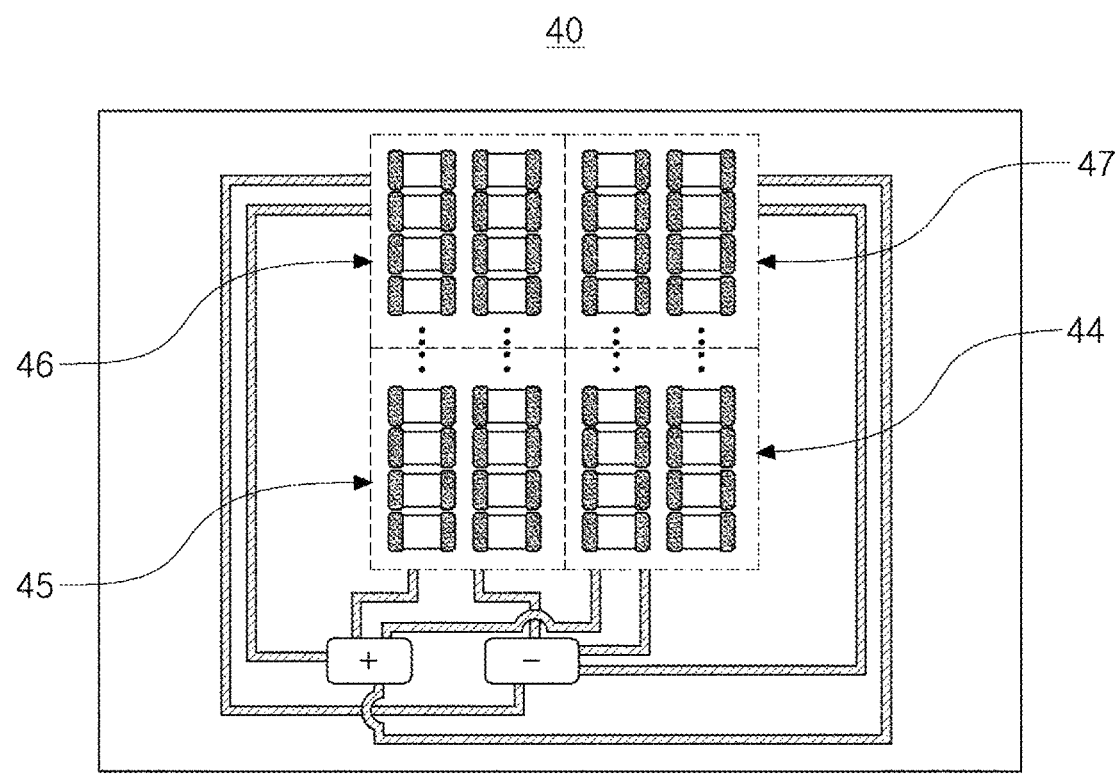
FIG. 4 is a schematic diagram illustrating an electrical connection form of an electronic device according to an embodiment of the present disclosure.
Figure 5:
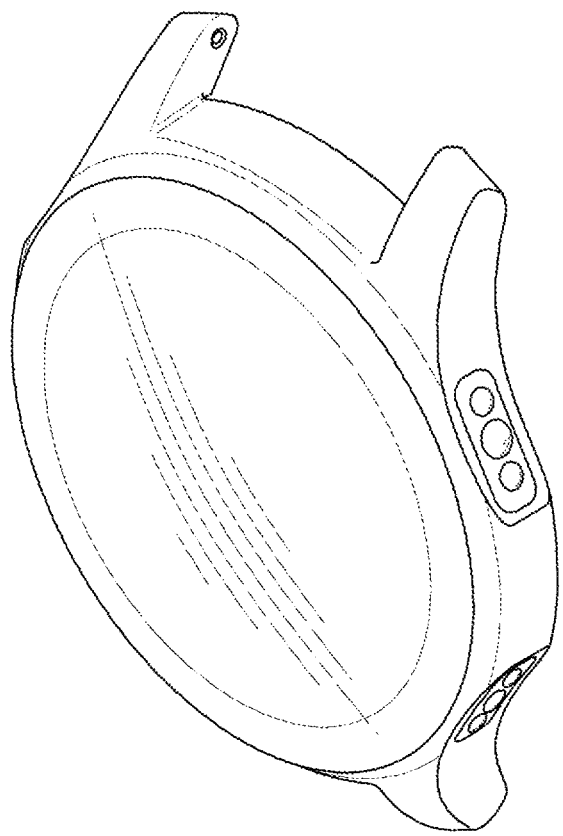
FIGS. 5 and 6 are perspective views schematically illustrating different embodiments of the present disclosure.
Figure 6:
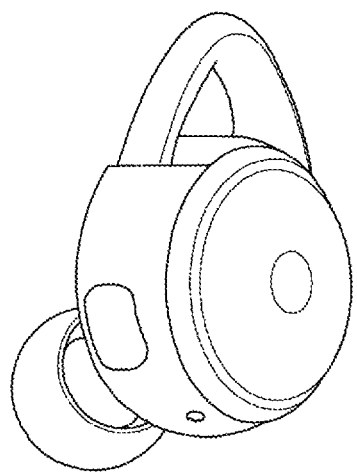
Figure 7:
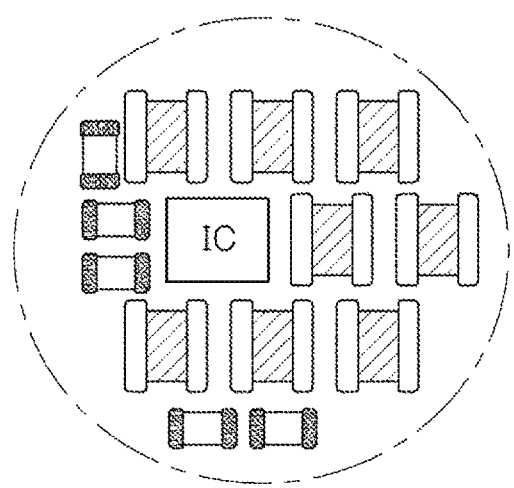
FIG. 7 is a cross-sectional view schematically illustrating the internal structure of FIG. 5.
Figure 8:
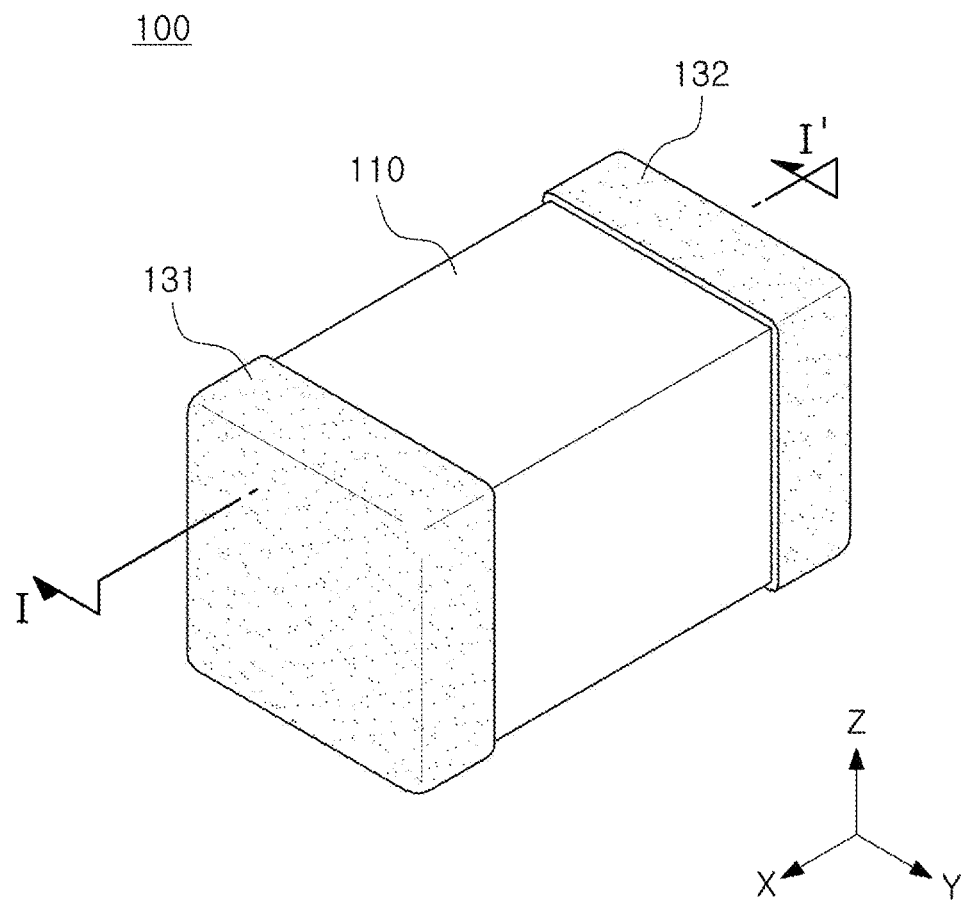
FIG. 8 is a perspective view schematically illustrating an all-solid-state battery applied to an embodiment of the present disclosure.

In another embodiment, at least two or more battery cells of the first to fifth battery cells may be connected in parallel. FIG. 4 is a diagram schematically illustrating an electrical connection form of an electronic device according to this embodiment. Referring to FIG. 4, an electronic device 40 according to an embodiment may include a plurality of battery cells 44, 45, 46 and 47, of which at least two or more battery cells may be connected in parallel. When two or more battery cells are connected in parallel as described above, deterioration of cells that may occur due to incorrect cell balancing may be prevented.

In addition, in the case of the above example, a battery cell connected in parallel may assist another battery cell when necessary, such as when one battery cell is first discharged or when the charge amount is insufficient compared to the expected amount of power. In this case, the power management circuit may detect the power consumption, may adjust the power consumption of the battery cells connected in parallel, and may control the battery cells to be assisted.

In an embodiment, the electronic device according to an embodiment includes a substrate, and at least one battery cell of the first to fifth battery cells may be mounted on the surface of the substrate. Also, according to another embodiment, at least one battery cell of the first to fifth battery cells may be mounted inside the substrate. In the above two embodiments, the battery cell mounted on the substrate includes one or more all-solid-state cells, and when mounted on the surface of the substrate, the all-solid-state cells may be directly mounted on the substrate, or when mounted inside the substrate, the all-solid-state battery may be directly mounted and placed inside the substrate. As in the above-described embodiments, when the battery cells are mounted on the surface and/or inside of the substrate and the remaining battery cells are disposed in a separate battery cell region, battery cells with relatively high replacement frequency are disposed in a separate region, battery cells that require less replacement may be disposed on and/or inside the substrate to increase the ease of post-management.

Hereinafter, an all-solid-state battery applied to the battery cell according to an embodiment of the present disclosure will be described in detail with reference to the drawings.

Referring to FIG. 4, one or more all-solid-state cells may be included in one battery cell 44. When there are a plurality of all-solid-state batteries, the all-solid-state batteries may be connected in series and/or in parallel as necessary.

FIGS. 8 to 13 are views illustrating an all-solid-state battery applied according to an embodiment of the present disclosure. Referring to FIGS. 8 to 13, all-solid-state batteries 100 and 200 according to embodiments include a body (110, 210) that includes a solid electrolyte layer (111, 211), and a positive electrode (121, 221) and a negative electrode (122, 222), disposed between the solid electrolyte layers (111, 211); and first and second external electrodes (131, 231, 132, 232) disposed on one surface of the body (110, 210) and the other surface opposing the one surface, and connected to the positive electrode (121, 221) and the negative electrode (122, 222), respectively. The positive electrode (121, 221) may include an positive electrode active material layer and a first electrolytic mixing portion (151, 251) disposed at the interface of the positive electrode (121, 221) in contact with the solid electrolyte layer (111, 211).

In this case, the first electrolytic mixing portion 151 and 251 may be formed by randomly mixing a positive electrode active material and a liquid and/or gel electrolyte. In this specification, the first electrolytic mixing portion may mean a region in which the positive electrode active material and the liquid and/or gel electrolyte are present together. For example, referring to FIGS. 10A and 10B, the first electrolytic mixing portion may indicate a region (151, 251) in which the positive electrode active material of the positive electrode (121, 221), and the liquid and/or gel electrolyte present in an area in which the positive electrode active material is not disposed, are disposed together.

The positive electrodes 121 and 221 included in the all-solid-state batteries 100 and 200 according to an embodiment may have recesses or pores formed in the surface. The recess may indicate a shape in which a groove is formed in the surfaces of the positive electrodes 121 and 221, and the pores may refer to voids disposed below the surface of the positive electrodes 121 and 221. When the positive electrodes 121 and 221 of the all-solid-state batteries according to embodiments have pores, the surfaces of the positive electrodes 121 and 221 may be porous.

When the recesses are formed in the surfaces of the positive electrodes 121 and 221, the average surface roughness of the positive electrodes 121 and 221 may be each 1.0 μm or more. In this specification, the average surface roughness (Ra) of any surface may be a value measured using an optical surface profiler such as 7300 Optical Surface Profiler manufactured by Zygo Corporation or measured using a surface roughness measuring instrument SV-3200 manufactured by Mitutoyo, or the like. The average surface roughness of the positive electrodes 121 and 221 may be each 1.0 μm or more, 1.2 μm or more, 1.4 μm or more, 1.6 μm or more, 1.8 μm or more, or 2.0 μm or more, but is not limited thereto. In addition, the upper limit of the average surface roughness (Ra) of the positive electrodes 121 and 221 of the all-solid-state batteries according to embodiments is not particularly limited, but may be, for example, 100 μm or less.

When pores are formed in the surfaces of the positive electrodes 121 and 221, the porosity of the pores may be within a range of 0.1 to 0.8. In this specification, porosity may mean a value representing a ratio of the area occupied by the pores to the total area. The porosity may be obtained through an electron scanning microscope analysis or a BET method, for example, using an image of an electron scanning microscope capturing a cross section of the positive electrode.

In an example, liquid and/or gel electrolytes may be filled in the recesses and/or pores disposed in the surfaces of the positive electrodes 121 and 221. The liquid phase may be a concept including a sol. In this specification, a sol may mean a colloidal suspension containing solid particles in a liquid medium, and a phase in which solid particles are dispersed in a liquid. In addition, the gel in this specification may mean that the colloidal liquid is solidified into a jelly shape, and may mean a phase in which solid particles in the liquid form a crosslinking network. The sol and the gel may mean a phase at room temperature and normal pressure (25° C., 1 atm), and may be mixed in a state in which the boundary between the sol and the gel is unclear.

In the all-solid-state battery according to the above example, recesses and/or pores are disposed in the surfaces of the positive electrodes 121 and 221, and liquid and/or gel electrolyte is filled inside the recesses and/or pores. Therefore, the contact between the solid electrolyte layers 111 and 211 and the positive electrodes 121 and 221 may be improved. In addition, a bottleneck problem at the interface between the solid electrolyte layers 111 and 211 and the positive electrodes 121 and 221 may be improved by improving the contact between the solid electrolyte layers 111 and 211 and the positive electrodes 121 and 221, respectively, thereby lowering an energy barrier.

Figure 9A:
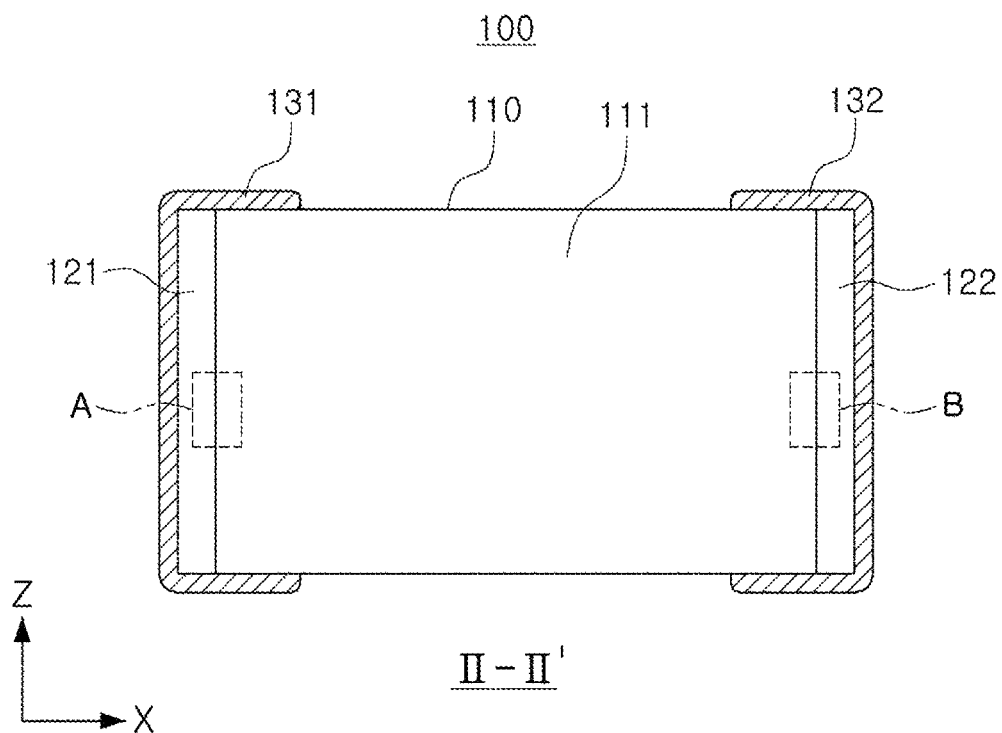
FIGS. 9A and 9B illustrate examples of an I-I' cross-section of FIG. 8.
Figure 9B:
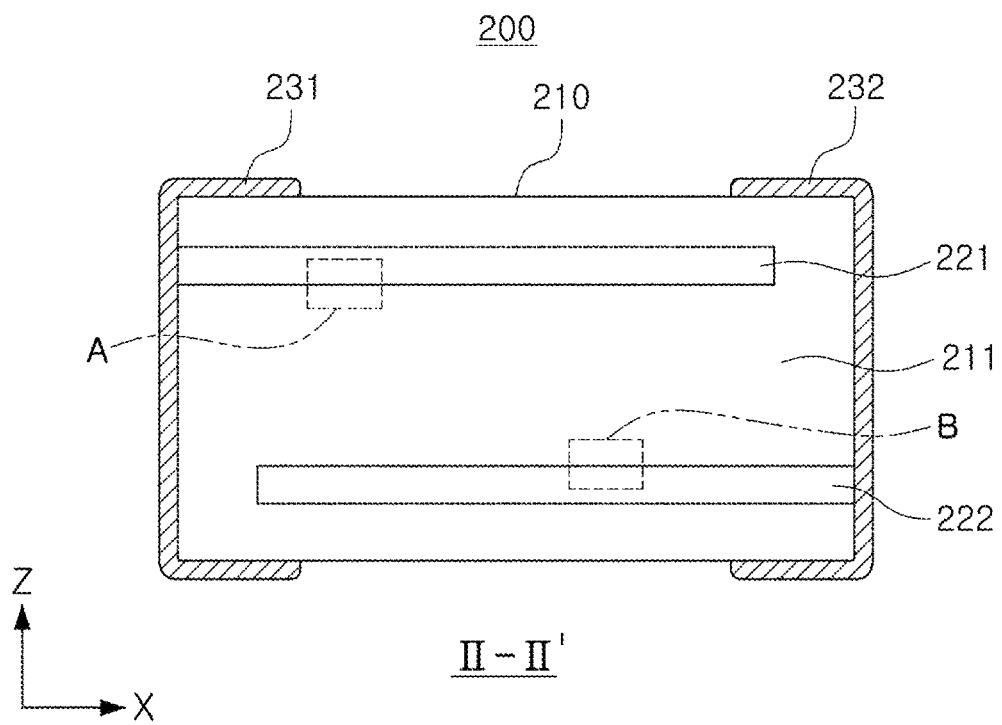
Figure 10A:
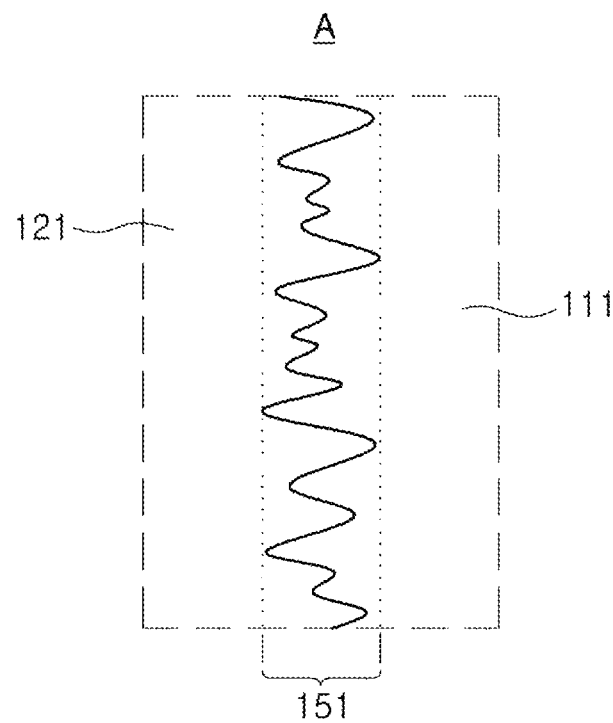
FIGS. 10A and 10B are enlarged views of region A of FIGS. 9A and 9B, respectively.
Figure 10B:
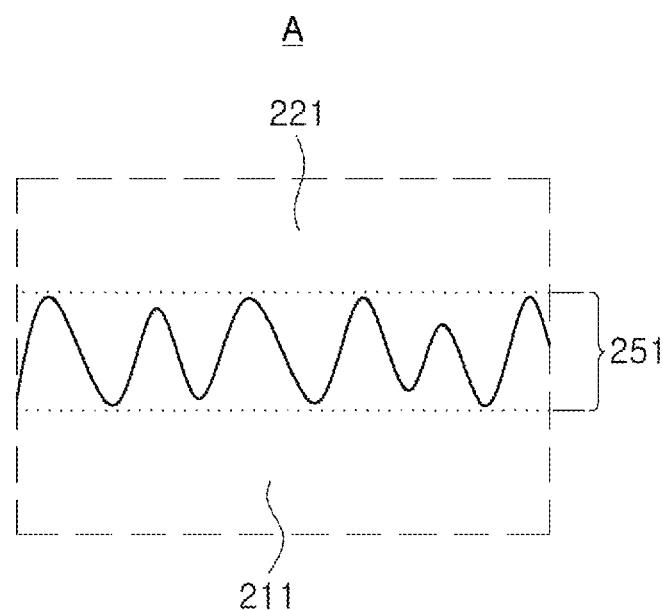
Figure 11A:
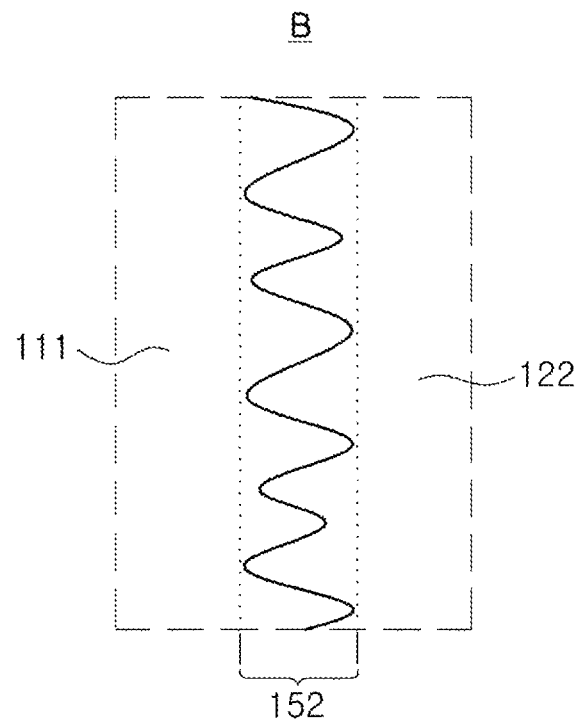
FIGS. 11A and 11B are enlarged views of region B of FIGS. 9A and 9B, respectively.
Figure 11B:
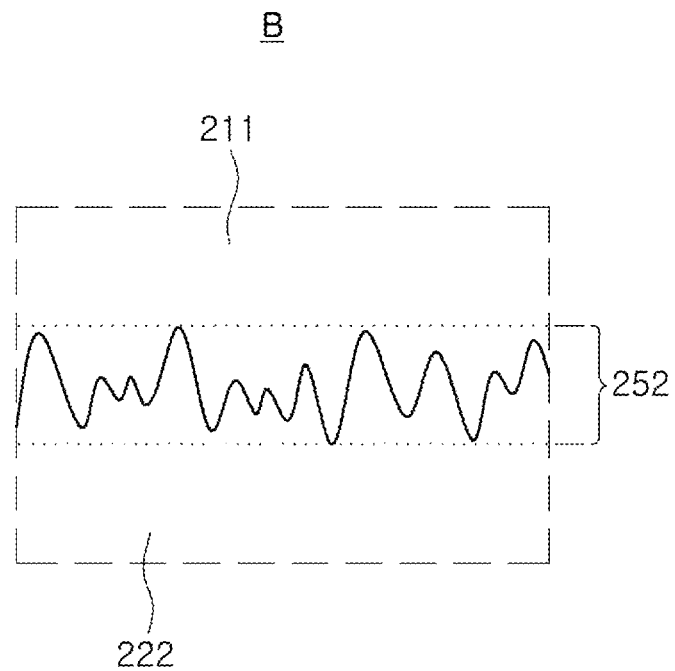

FIGS. 9A and 9B illustrate modified examples of the all-solid-state batteries according to embodiments. Referring to FIGS. 9A and 9B, the positive electrode (121, 221) and the negative electrode (122, 222) of the all-solid-state battery (100, 200) according to an embodiment may be disposed to face each other in the first direction (the X direction) (see FIG. 9A) or to face each other in the third direction (the Z direction) (see FIG. 9B).

According to an embodiment, the volume fraction of the liquid and/or gel electrolyte of the first electrolytic mixing portions 151 and 251 may be respectively in the range of 0.2 to 0.8. The volume fraction may mean the ratio of the volume of the liquid and/or gel electrolyte to the total volume of each of the first electrolytic mixing portions 151 and 251. The total volume of the first electrolytic mixing portions 151 and 251 may be respectively obtained through the calculation of the hexahedral geometry, and the volume of the liquid and/or gel electrolyte may be obtained by measuring the volume of a region in which the positive electrode active material is not present in each of the first electrolytic mixing portions 151 and 251 using a Surface Area and Porosimetry Analyzer such as ASAP-2020 from Micromeritics.

In an example, the positive electrode active material included in the positive electrode 121, 221 is not particularly limited as long as it may secure a sufficient capacity. For example, the positive electrode active material may include at least one selected from the group consisting of lithium cobalt oxide, lithium nickel cobalt manganese oxide, lithium nickel cobalt aluminum oxide, lithium iron phosphate, and lithium manganese oxide, but is not limited thereto. Any positive electrode active material available in the art may be used.

The positive electrode active material may be, for example, a compound represented by the following formula: $Li_aA_{1-b}M_bD_2$ (where $0.90 \leq a \leq 1.8$, $0 \leq b \leq 0.5$); $Li_aE_{1-b}MbO_{2-c}D_c$ (where $0.90 \leq a \leq 1.8$, $0 \leq b \leq 0.05$, $0 \leq c \leq 0.05$); $LiE_{2-b}M_bO_{4-c}D_c$ (where $0 \leq b \leq 0.5$, $0 \leq c \leq 0.05$); $LiaNi_{1-b-c}Co_bM_cD_\alpha$ (where $0.90 \leq a \leq 1.8$, $0 \leq b \leq 0.5$, $0 \leq c \leq 0.05$, $0 < \alpha \leq 2$); $Li_aNi_{1-b-c}Co_bMcO_{2-o}X_\alpha$ (where $0.90 \leq a \leq 1.8$, $0 \leq b \leq 0.05$, $0 \leq c \leq 0.05$, $0 < iaNiwing_aNi_{1-b-c}CO_bMcO_{2-o}X_2$ (where $0.90 \leq a \leq 1.8$, $0 \leq b \leq 0.5$, $0 \leq c \leq 0.05$, $0 < iaNiwing_aNi_{1-b-c}Mn_bM_cD_\alpha$ (where $0.90 \leq a \leq 1.8$, $0 \leq b \leq 0.05$, $0 \leq c \leq 0.5$, $0 < \alpha \leq 2$); $Li_aNi_{1-b-c}Mn_bM_cO_{2-b}X_\alpha$ (where $0.90 \leq a \leq 1.8$, $0 \leq b \leq 0.05$, $0 \leq c \leq 0.05$, $0 < iaNiwing_aNi_{1-b-c}Mn_bM_cO_{2-b}X_2$ (where $0.90 \leq a \leq 1.8$, $0 \leq b \leq 0.05$, $0c \leq 0.05$, $0 < iaNiwing_aNi_bE_cGdO_2$ (where $0.90 \leq a \leq 1.8$, $0 \leq b \leq 0.05$, $0 \leq c \leq 0.05$, $0.001 \leq d \leq 0.1$); $Li_aNi_{b-}Co_cMn_dGeO_2$ (where $0.90 \leq a \leq 1.8$, $0 \leq c \leq 0.5$, $0 \leq d \leq 0.5$, $0.001 \leq e \leq 0.1$); $Li_aNiG_bO_2$ (where $0.90 \leq a \leq 1.8$, $0.001 \leq b \leq 0.1$); $Li_aCoG_bO_2$ (where $0.90 \leq a \leq 1.8$, $0.001 \leq b \leq 0.1$); $Li_aMnG_bO_2$ (where $0.90 \leq a \leq 1.8$, $0.001 \leq b \leq 0.1$); $Li_aMn_2G_bO_4$ (where $0.90 \leq a \leq 1.8$, $0.001 \leq b \leq 0.1$); $QO_2$; $QS_2$; $LiQS_2$; $V_2O_5$; $LiV_2O_2$; $LiRO_2$; $LiNiVO_4$; $Li_{(3-f)}J_2(PO_4)_3$ ($0 \leq f \leq 2$); $Li_{(3-f)}Fe_2(PO_4)_3$ (where $0 \leq f \leq 2$); and $LiFePO_4$. In the above formula, A is Ni, Co, or Mn; M is Al, Ni, Co, Mn, Cr, Fe, Mg, Sr, V, or a rare-earth element; D is O, F, S, or P; E is Co or Mn; X is F, S or P; G is Al, Cr, Mn, Fe, Mg, La, Ce, Sr or V; Q is Ti, Mo or Mn; R is Cr, V, Fe, Sc or Y; and J is V, Cr, Mn, Co, Ni or Cu.

The positive electrode active material may also be $LiCoO_2$, $LiMn_xO_{2x}$ (where x=1 or 2), $LiNi_{1-x}Mn_xO_{2x}$ (where $0<x<1$), $LiNi_{1-x-y}Co_xMn_yO_2$ (where $0 \leq x \leq 0.5$, $0 \leq y \leq 0.5$), $LiFePO_4$, $TiS_2$, $FeS_2$, $TiS_3$, or $FeS_3$, but is not limited thereto.

The positive electrode of the all-solid-state battery according to an embodiment may selectively include a conductive agent, a binder, and a positive electrode current collector. The conductive agent is not particularly limited as long as it has conductivity without causing a chemical change in the all-solid-state battery according to an embodiment of the present disclosure. For example, graphite, such as natural graphite and artificial graphite; a carbon-based material such as carbon black, acetylene black, ketjen black, channel black, furnace black, lamp black, and summer black; a conductive fiber such as carbon fiber and metal fiber; carbon fluoride; a metal powder such as aluminum and nickel powder; a conductive whisker such as zinc oxide and potassium titanate; a conductive metal oxide such as titanium oxide; or a conductive material such as polyphenylene derivative may be used.

The content of the conductive agent is 1 to 10 parts by weight, in detail, 2 to 5 parts by weight, based on 100 parts by weight of the total weight of the positive electrode active material. When the content of the conductive agent is within the above range, the electrode finally obtained may have excellent conductivity characteristics.

The binder may be used to improve the bonding force between the active material and the conductive agent. The binder may be polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, ethylene-propylene-diene terpolymer (EPDM), sulfonated EPDM, styrene butadiene rubber, fluorine rubber, various copolymers and the like, but is not limited thereto. The content of the binder may be 1 to 50 parts by weight, in detail, 2 to 5 parts by weight, based on 100 parts by weight of the total weight of the positive electrode active material. When the content of the binder satisfies the above range, the active material layer may have a relatively high bonding force.

As the positive electrode current collector, a porous body such as a net shape or a mesh shape may be used, and a porous metal plate such as stainless steel, nickel, and aluminum may be used, but the porous metal plate is not limited thereto. In addition, the positive electrode current collector may be coated with an oxidation-resistant metal or alloy coating to prevent oxidation.

The positive electrode applied to the all-solid-state battery according to an embodiment of the present disclosure may be prepared by directly coating and drying a composition containing a positive electrode active material on a positive electrode current collector containing a metal such as copper. Alternatively, the positive electrode active material composition may be cast on a separate support and then cured to produce a positive electrode, and in this case, a separate positive electrode current collector may not be included.

According to an embodiment, the liquid and/or gel electrolyte included in the first electrolytic mixing portions 151 and 251 may include a lithium salt. The lithium salt includes, for example, $Li^+$ as a cation of the lithium salt, and includes, as an anion, at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The lithium salt may include a single material or a mixture of two or more selected from the group consisting of, for example, LiCl, LiBr, LiI, $LiClO_4$, $LiBF_4$, $LiB_{10}Cl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, and $LiCH_3SO_3$, and in addition thereto, may include electrolyte salt such as lithium imide salt represented by lithium bisperfluoroethanesulfonimide (Li-BETI, $LiN(SO_2C_2F_5)_2$), lithium fluorosulfonyl imide (LiFSI, $LiN(SO_2F)_2$), and lithium (bis)trifluoromethanesulfonimide (LiTFSI, $LiN(SO_2CF_3)_2$), generally used for an electrolyte of a lithium secondary battery. As a detailed example of the lithium salt, a single material or a mixture of two or more selected from the group consisting of $LiPF_6$, $LiBF_4$, $LiCH_3CO_2$, $LiCF_3CO_2$, $LiCH_3SO_3$, LiFSI, LiTFSI and $LiN(C_2F_5SO_2)_2$ may be provided, but is not limited thereto.

The lithium salt is dissolved in an organic solvent and may be included as a liquid phase in the first electrolytic mixing portions 151 and 251. Examples of the organic solvent may include propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, fluoroethylene carbonate, benzonitrile, acetonitrile, tetrahydrofuran, 2-methyltetrahydrofuran, gamma butyrolactone, 1,3-dioxolane, 4-methyldioxoran, N,N-dimethylformamide, N,N-dimethylacetamide, dimethyl sulfoxide, dioxane, 1,2-dimethoxyethane, sulfolane, dichloroethane, chlorobenzene, nitrobenzene, diethylene glycol, dimethyl ether, mixtures thereof and the like, but are not limited thereto.

When the lithium salt is dissolved in an organic solvent, the concentration of the lithium salt may be 0.1 to 5.0 M. In the concentration range, the liquid and/or gel electrolyte contained in the first electrolytic mixing portion described above may have relatively high ionic conductivity and may also be suitably used in the case of a gel phase described later.

In addition, when the lithium salt is included in the first electrolytic mixing portion (151, 251) as a gel phase, the first electrolytic mixing portions 151 and 251 may include a polymer. The polymer is not particularly limited as long as it may form a gel phase. Non-limiting examples of the polymer may include polyethylene oxide (PEO), poly(methyl methacrylate) (PMMA), polypropylene oxide (PPO), polyvinylidene fluoride (PVdF), Polyvinylidene fluoride-hexafluoropropylene (PVdF-HFP), polyvinylidene fluoride-hexachloro propylene (PVdF-HFP), polystyrene (PS) polyvinyl chloride (PVC), polyvinyl alcohol (PVA), polyacrylonitrile (PAN), polyester sulfide (PES), and derivatives thereof.

The content of the polymer is not particularly limited as long as the lithium salt may form a gel and/or sol phase. For example, the polymer may be 1 to 50% by weight of the total weight of the total liquid and/or gel electrolyte.

The method in which the liquid and/or gel electrolyte according to an embodiment of the present disclosure is included in the first electrolytic mixing portions 151 and 251 is not particularly limited. For example, when the body including the positive electrode, the negative electrode and the solid electrolyte is formed by firing, the positive electrode, the negative electrode and/or the solid electrolyte have recesses and/or pores in the surface due to firing shrinkage. When the electrolyte to be applied is a liquid phase, the body including the liquid electrolyte may be manufactured by immersing the body in which the recesses and/or pores are formed in the liquid electrolyte to absorb the electrolyte and then forming an insulating film on the outside thereof. In addition, when the electrolyte to be applied is a gel phase, after mixing the curing agent and the precursor and of the above-described polymer in the liquid electrolyte, the body is immersed in the mixed solution to absorb the mixed solution and then be followed by heating, such that a crosslinking reaction may be induced to form a polymer matrix and thus form a gel-phase electrolyte in an electrolytic mixing portion.

In an embodiment, the first electrolytic mixing portions 151 and 251 of the all-solid-state batteries according to embodiments may have a thickness in the range of 1.0 μm to 100.0 μm. The thickness may be 1.0 μm or more, 1.2 μm or more, 1.4 μm or more, 1.6 μm or more, 1.8 μm or more, or 2.0 μm or more, and may be 100 μm or less or 90 μm or less, but is not limited thereto.

In an embodiment, the negative electrode 122, 222 of the all-solid-state battery 100, 200 according to an embodiment may include the second electrolytic mixing portion 152, 252 at the interface of the negative electrode 122, 222, which contacts the solid electrolyte 111, 211. The second electrolytic mixing portions 152 and 252 may be provided by randomly mixing a negative electrode active material and a liquid and/or gel electrolyte. In this specification, the second electrolytic mixing portions 152 and 252 may be regions in which the negative electrode active material and the liquid and/or gel electrolyte are present together. For example, referring to FIGS. 11A and 11B, the second electrolytic mixing portions (152 and 252) may indicate the regions 152 and 252 in which the negative electrode active material of the negative electrodes 122 and 222 and the liquid and/or gel electrolyte present in an area in which the negative electrode active material is not disposed are disposed together.

The negative electrodes 122 and 222 included in the all-solid-state batteries 100 and 200 according to the embodiments may have recesses or pores formed in the surface. The recess may mean a shape in which a groove is formed in the surfaces of the negative electrodes 122 and 222, and the pores may refer to voids disposed below the surfaces of the negative electrodes 122 and 222. When the negative electrodes 122 and 222 of the all-solid-state batteries according to embodiments have pores, the surfaces of the negative electrodes 122 and 222 may be porous.

When the recesses are formed in the surfaces of the negative electrodes 122 and 222, the average surface roughness of each of the negative electrodes 122 and 222 may be 1.0 μm or more. The average surface roughness of each of the negative electrodes 122 and 222 may be 1.0 μm or more, 1.2 μm or more, 1.4 μm or more, 1.6 μm or more, 1.8 μm or more, or 2.0 μm or more, but is not limited thereto. In addition, the upper limit of the average surface roughness (Ra) of each of the negative electrodes 122 and 222 of the all-solid-state batteries according to embodiments is not particularly limited, but may be, for example, 100 μm or less. In addition, when pores are formed in the surfaces of the negative electrodes 122 and 222, the porosity of the pores may be within a range of 0.1 to 0.8.

In an example, the liquid-phase and/or gel-phase electrolyte may be filled inside the recesses and/or pores disposed in the surfaces of the negative electrodes 122 and 222. The liquid phase may be a concept including a sol. In the all-solid-state batteries according to the above examples, the recesses and/or pores are disposed in the surfaces of the negative electrodes 122 and 222, and the liquid-phase and/or gel-phase electrolyte is filled inside the recesses and/or pores, thereby improving contact properties between the solid electrolyte layer 111, 211 and the negative electrode 122, 222. In addition, a bottleneck problem at the interface between the solid electrolyte layer 111, 211 and the negative electrode 122, 222 may be prevented by improving the contact between the solid electrolyte layer 111, 211 and the negative electrode 122, 222, thereby lowering an energy barrier.

According to an embodiment, the volume fraction of the liquid and/or gel electrolyte of each of the second electrolytic mixing portions 152 and 252 may be in the range of 0.2 to 0.8. The volume fraction may indicate the ratio of the volume of the liquid and/or gel electrolyte to the total volume of each of the second electrolytic mixing portions 152 and 252. The description of the liquid and/or gel electrolyte is the same as that of the electrolyte of the first electrolytic mixing portion, and will thus be omitted.

In an embodiment, the second electrolytic mixing portions 152 and 252 of the all-solid-state batteries according to embodiments may each have a thickness in the range of 1.0 μm to 100.0 μm. The thickness may be 1.0 μm or more, 1.2 μm or more, 1.4 μm or more, 1.6 μm or more, 1.8 μm or more, or 2.0 μm or more, and may be 100 μm or less or 90 μm or less, but is not limited thereto.

The negative electrode included in the all-solid-state battery according to an embodiment may include a commonly used negative electrode active material. As the negative electrode active material, a carbon-based material, silicon, silicon oxide, a silicon-based alloy, a silicon-carbon-based material composite, tin, a tin-based alloy, a tin-carbon composite, a metal oxide or a combination thereof may be used, and the negative electrode active material may include a lithium metal and/or a lithium metal alloy.

The lithium metal alloy may include lithium and a metal/metalloid capable of alloying with lithium. For example, the metal/metalloid capable of alloying with lithium may be Si, Sn, Al, Ge, Pb, Bi, Sb, or Si—Y alloy (where Y is an alkali metal, alkaline earth metal, group 13 to 16 elements, transition metal, rare earth element or combinations thereof, and does not contain Si), an Sn—Y alloy (where Y is an alkali metal, alkaline earth metal, group 13 to group 16 elements, transition metal, transition metal oxide of lithium titanium oxide ($Li_4Ti_5O_{12}$), etc., a rare earth element or combination elements thereof, and does not include Sn), MnOx (0<x≤2), etc. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or combinations thereof.

Further, the oxide of the metal/metalloid capable of alloying with lithium may be lithium titanium oxide, vanadium oxide, lithium vanadium oxide, $SnO_2$, $SiO_x$(0<x<2), or the like. For example, the negative electrode active material may include one or more elements selected from the group consisting of group 13 to group 16 elements of the Periodic Table of Elements. For example, the negative electrode active material may include one or more elements selected from the group consisting of Si, Ge and Sn.

The carbon-based material may be crystalline carbon, amorphous carbon, or a mixture thereof. The crystalline carbon may be graphite such as amorphous, plate-like, flake-like, spherical or fibrous natural graphite or artificial graphite. In addition, the amorphous carbon may be soft carbon (low temperature fired carbon) or hard carbon, mesophase pitch carbide, fired coke, graphene, carbon black, fullerene soot, Carbon nanotubes, carbon fiber, or the like, but is not limited thereto.

The silicon may be selected from the group consisting of Si, $SiO_x$ ($0<x<2$, for example 0.5 to 1.5), Sn, $SnO_2$, or a silicon-containing metal alloy and mixtures thereof. The silicon-containing metal alloy may include, for example, silicon and at least one of Al, Sn, Ag, Fe, Bi, Mg, Zn, In, Ge, Pb, or Ti.

The negative electrode may be manufactured in almost the same manner as the positive electrode manufacturing process described above, except that the negative electrode active material is used instead of the positive electrode active material.

In an embodiment, the solid electrolyte layer according to an embodiment may be one or more selected from the group consisting of a Garnet-type, a Nasicon-type, a LISICON-type, a perovskite-type, and a LiPON-type.

The garnet-based solid electrolyte may indicate lithium-lanthanum zirconium oxide (LLZO) represented by $Li_aL-a_bZr_cO_{12}$, such as $Li_7La_3Zr_2O_{12}$ or the like, and the nasicon-type solid electrolyte may indicate lithium-aluminum-titanium-phosphate (LATP) of $Li_{1+x}Al_xTi_{2-x}(PO_4)_3$ ($0<x<1$) in which Ti is introduced into a $Li_{1+x}Al_xM_{2-x}(PO_4)_3$(LAMP) ($0<x<2$, M=Zr, Ti, Ge)-type compound, lithium-aluminum-germanium-phosphate (LAGP) represented by $Li_{1+x}Al_xGe_{2-x}(PO_4)_3$ ($0<x<1$), such as $Li_{1.3}Al_{0.3}Ti_{1.7}(PO_4)_3$ or the like in which excess lithium is introduced, and/or lithium-zirconium-phosphate (LZP) of $LiZr_2(PO_4)_3$.

In addition, the LISICON-type solid electrolyte may indicate a solid solution oxide represented by $xLi_3AO_4$-$(1-x)Li_4BO_4$ (A: P, As, V, etc., B: Si, Ge, Ti, etc.) and including $Li_4Zn(GeO_4)_4$, $Li_{10}GeP_2O_{12}$ (LGPO), $Li_{3.5}Si_{0.5}P_{0.5}O_4$, $Li_{10.42}Si(Ge)_{1.5}P_{1.5}Cl_{0.08}O_{11.92}$, etc., and solid solution sulfide including $Li_2S$—$P_2S_5$, $Li_2S$—$SiS_2$, $Li_2S$—$SiS_2$—$P_2S_5$, $Li_2S$—$GeS_2$, etc. represented by $Li_{4-x}M_{1-y}M'_y{}'S_4$ (M=Si, Ge and M'=P, Al, Zn, Ga).

In addition, the perovskite-type solid electrolyte may indicate lithium-lanthanum-titanate-oxide (LLTO) represented by $Li_{3x}La_{2/3-x}\square_{1/3-2x}TiO_3$ ($0<x<0.16$, $\square$: vacancy), such as $Li_{1/8}La_{5/8}TiO_3$ or the like, and the LiPON-type solid electrolyte may refer to a nitride such as lithium-phosphorus-oxynitride, for example, such as $Li_{2.8}PO_{3.3}N_{0.46}$ or the like.

In an example, the ionic conductivity of the solid electrolyte applied to the all-solid-state battery according to an embodiment of the present disclosure may be $10^{-3}$ S/cm or more. The ionic conductivity may be a value measured at a temperature of 25° C. The ionic conductivity may be $1\times10^{-3}$ S/cm or more, $2\times10^{-3}$ S/cm or more, $3\times10^{-3}$ S/cm or more, $4\times10^{-3}$ S/cm or more, or $5\times10^{-3}$ S/cm or more, and the upper limit thereof is not particularly limited, but may be, for example, $1\times10^0$ S/cm. When using a solid electrolyte that satisfies the ionic conductivity in the above range, the all-solid-state battery according to an embodiment may exhibit relatively high output.

The all-solid-state battery according to an embodiment may include a cover portion (not illustrated). The cover portion may be disposed on a third surface S3 to a sixth surface S6 of the body 110, 210. The cover portion may be formed of an insulating material, and may be formed by attaching a film such as a polymer resin or by applying a ceramic material on the body and then firing.

In the case of the all-solid-state battery according to an embodiment, a first external electrode 131, 231 and a second external electrode 132, 232 may be disposed on both surfaces of the body in the first direction (the X direction). The first external electrodes 131 and 231 may be connected to the positive electrodes 121 and 221, and the second external electrodes 132 and 232 may be connected to the negative electrodes 122 and 222.

The first external electrodes 131 and 231 and the second external electrodes 132 and 232 may include a conductive metal and glass. The conductive metal may be a conductive metal of one or more of, for example, copper (Cu), nickel (Ni), tin (Sn), palladium (Pd), platinum (Pt), gold (Au), silver (Ag), tungsten (W), titanium (Ti), lead (Pb) and alloys thereof, but is not limited thereto. Further, the glass component included in the first external electrodes 131 and 231 and the second external electrodes 132 and 232 may have a composition in which oxides are mixed. The glass component may be one or more selected from the group consisting of, for example, silicon oxide, boron oxide, aluminum oxide, transition metal oxide, alkali metal oxide, and alkaline earth metal oxide, but is not limited thereto. The transition metal is selected from the group consisting of zinc (Zn), titanium (Ti), copper (Cu), vanadium (V), manganese (Mn), iron (Fe), and nickel (Ni), and the alkali metal is selected from the group consisting of lithium (Li), sodium (Na) and potassium (K), and the alkaline earth metal may be at least one or more selected from the group consisting of magnesium (Mg), calcium (Ca), strontium (Sr) and barium (Ba).

The method of forming the first external electrode 131, 231 and the second external electrode 132, 232 is not particularly limited. For example, the first and second external electrodes may be formed by dipping the body in a conductive paste containing a conductive metal and glass, or may be formed by printing the conductive paste on a surface of the body by a screen printing method or a gravure printing method. In addition, various methods may be used, such as applying the conductive paste to the surface of the body or transferring a dry film obtained by drying the conductive paste on the body, but are not limited thereto.

Figure 12:
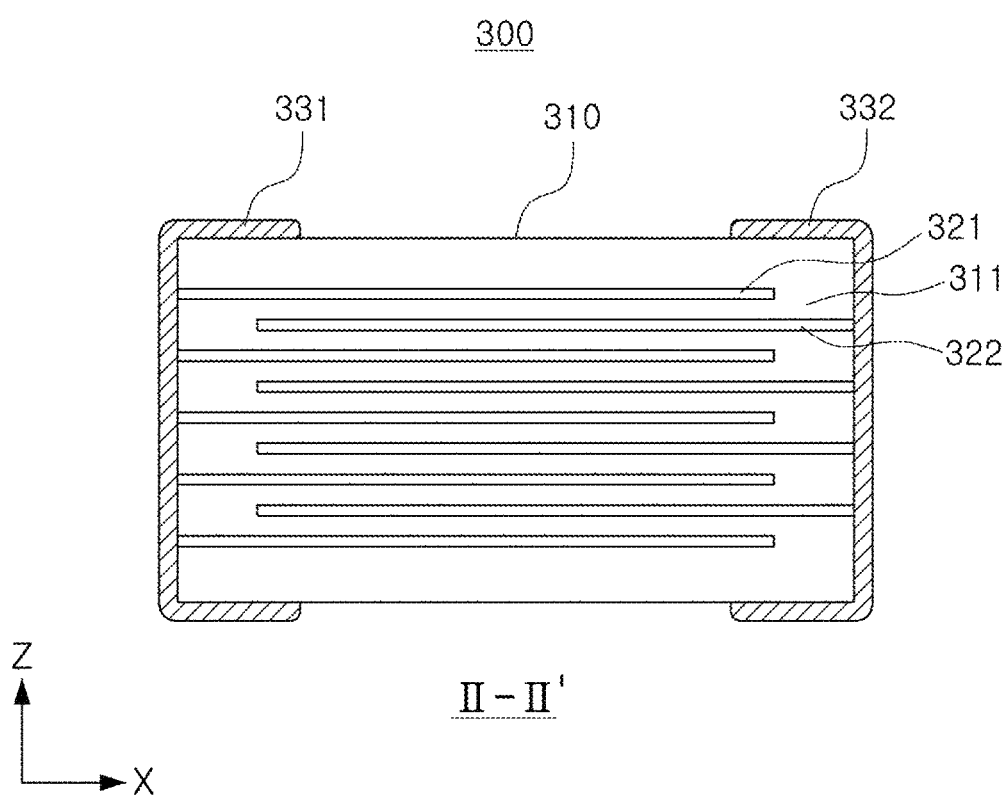
FIG. 12 is a cross-sectional view of an all-solid-state battery according to another embodiment of the present disclosure.
Figure 13:
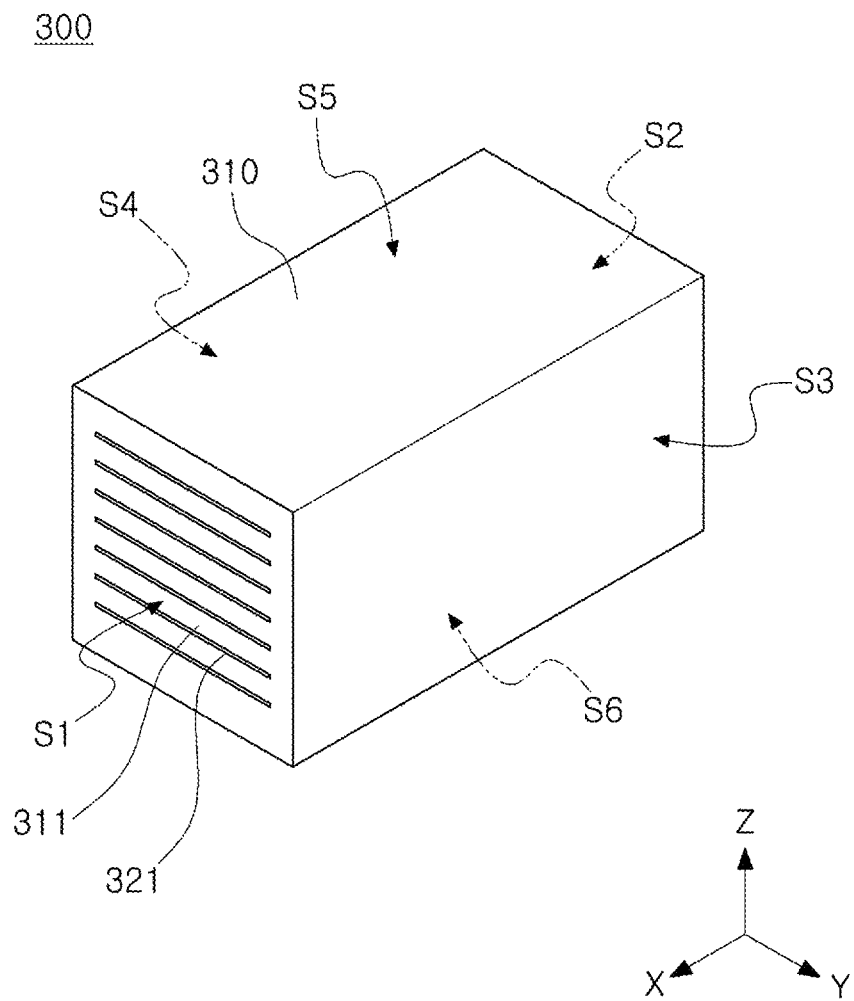
FIG. 13 is a perspective view schematically illustrating a body of FIG. 12.

According to another embodiment, an all-solid-state battery 300 according to another embodiment of the present disclosure may include two or more positive and negative electrodes, respectively. In this case, a plurality of positive electrodes, solid electrolyte layers and negative electrodes may be sequentially stacked. FIG. 12 is a cross-sectional view of an all-solid-state battery 300 according to this embodiment, and FIG. 13 is a perspective view schematically illustrating a body 310 according to this embodiment. Referring to FIGS. 12 and 13, a plurality of positive electrodes 321 and negative electrodes 322 may be disposed to face each other with a solid electrolyte layer 311 interposed therebetween. The positive electrodes 321 may be exposed through a first surface S1 of the body 310, and portions of the positive electrodes 321 exposed to the first surface S1 of the body 310 may be connected to a first external electrode 331. In addition, the negative electrodes 322 may be exposed through a second surface S2 of the body 310, and portions of the negative electrodes 322 exposed to the second surface S2 of the body 310 may be connected to a second external electrode 332. When a plurality of positive and negative electrodes facing each other are included as described above, the all-solid-state battery according to an embodiment may implement relatively high capacity, high energy density and/or high current.

In the above embodiment, a first electrolytic mixing portion and a second electrolytic mixing portion may be disposed on the surfaces of the positive electrode 321 and the negative electrode 322 facing each other with the solid electrolyte layer 311 therebetween, respectively. The first electrolytic mixing portion and the second electrolytic mixing portion are disposed on the surfaces of the plurality of positive electrodes 321 and the negative electrode 322, respectively, thereby further improving contact between the solid electrolyte 311 and the electrodes. Descriptions of the first and second electrolytic mixing portions are the same as described above, and thus will be omitted.

As set forth above, according to an embodiment, an electronic device having a high degree of freedom in structural design may be provided.

According to another embodiment, an electronic device having excellent electrochemical stability may be provided.

According to another embodiment, an electronic device capable of reducing power loss may be provided.

According to another embodiment, an electronic device in which deterioration of a battery cell may be prevented is provided.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic device comprising:
a storage in which at least one or more programs are stored;
a power management circuit;
a controller controlling the storage and the power management circuit;
a first battery cell connected to the power management circuit; and
a second battery cell connected to the storage,
wherein at least one of the first battery cell or the second battery cell includes an all-solid-state battery,
the first battery cell is spaced apart from the second battery cell, and
the all-solid-state battery comprises:
a body including a plurality of positive electrodes and a plurality of negative electrodes that are sequentially stacked with a solid electrolyte layer interposed therebetween, the positive and negative electrodes extending in a length direction and having one ends extending to first and second surfaces of the body, respectively; and
a first external electrode and a second external electrode disposed on the first and second surfaces of the body, and connected to the one ends of the positive and negative electrodes, respectively.

2. The electronic device of claim 1, further comprising a communication unit communicating with an external device and a third battery cell connected to the communication unit.

3. The electronic device of claim 2, further comprising an audio output unit outputting an audio signal and a fourth battery cell connected to the audio output unit.

4. The electronic device of claim 3, further comprising a display and a fifth battery cell connected to the display.

5. The electronic device of claim 4, wherein at least one battery cell among the first to fifth battery cells is spaced apart from the other battery cells.

6. The electronic device of claim 4, wherein at least one battery cell among the first to fifth battery cells has a different charging capacity from charging capacities of the other battery cells.

7. The electronic device of claim 4, wherein at least one battery cell among the first to fifth battery cells has a different operating voltage from operating voltages of the other battery cells.

8. The electronic device of claim 4, wherein at least two or more of the first to fifth battery cells are connected in parallel.

9. The electronic device of claim 4, further comprising a substrate,
wherein at least one battery cell among the first to fifth battery cells is mounted on a surface of the substrate.

10. The electronic device of claim 4, further comprising a substrate,
wherein at least one battery cell among the first to fifth battery cells is mounted inside the substrate.

11. The electronic device of claim 1, wherein the all-solid-state battery comprises a solid electrolyte, and
the solid electrolyte has an ionic conductivity of $10_{-3}$ S/cm or more.

12. The electronic device of claim 1, wherein the positive and negative electrodes are spaced apart from upper and lower surfaces of the body opposing each other in the thickness direction.

13. An electronic device comprising:
a storage in which at least one or more programs are stored;
a power management circuit;
a controller controlling the storage and the power management circuit; and
a plurality of battery cells each including an all-solid-state battery,
wherein a first battery cell among the plurality of battery cells is connected to the power management circuit,
a second battery cell among the plurality of battery cells is connected to the storage;
the first battery cell is spaced apart from the second battery cell, and
the all-solid-state battery comprises:
a body including a plurality of positive electrodes and a plurality of negative electrodes that are sequentially stacked with a solid electrolyte layer interposed therebetween, the positive and negative electrodes extending in the length direction and having one ends extending to first and second surfaces of the body, respectively; and
a first external electrode and a second external electrode disposed on the first and second surfaces of the body, and connected to the one ends of the positive and negative electrodes, respectively.

14. The electronic device of claim 13, wherein the plurality of battery cells have different charging capacities from each other.

15. The electronic device of claim 13, wherein the plurality of battery cells have different operating voltages from each other.

\* \* \* \* \*